(12) United States Patent
Pohl et al.

(10) Patent No.: US 11,889,227 B2
(45) Date of Patent: Jan. 30, 2024

(54) OCCLUSION PROCESSING FOR FRAME RATE CONVERSION USING DEEP LEARNING

(71) Applicant: SAMSUNG ELECTRONICS CO., LTD., Suwon-si (KR)

(72) Inventors: Petr Pohl, Lobnya (RU); Sergei Dmitrievich Ilichev, Moscow (RU); Igor Mironovich Kovliga, Moscow (RU); Kristina Olegovna Rakova, Omsk (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 318 days.

(21) Appl. No.: 17/526,639

(22) Filed: Nov. 15, 2021

(65) Prior Publication Data

US 2022/0109807 A1 Apr. 7, 2022

Related U.S. Application Data

(63) Continuation of application No. PCT/KR2021/013597, filed on Oct. 5, 2021.

(30) Foreign Application Priority Data

Oct. 5, 2020 (RU) .................................. 2020132721

(51) Int. Cl.
   *H04N 7/01* (2006.01)
   *G06N 3/08* (2023.01)
   *G06N 3/04* (2023.01)

(52) U.S. Cl.
   CPC .............. *H04N 7/014* (2013.01); *G06N 3/04* (2013.01); *G06N 3/08* (2013.01); *H04N 7/0127* (2013.01); *H04N 7/0137* (2013.01)

(58) Field of Classification Search
   CPC .... H04N 7/014; H04N 7/0127; H04N 7/0137; G06N 3/04; G06N 3/08
   See application file for complete search history.

(56) References Cited

U.S. PATENT DOCUMENTS 8,175,163 B2  5/2012  Chappalli et al.
8,565,309 B2  10/2013  Lertrattanapanich et al.
(Continued)

FOREIGN PATENT DOCUMENTS

CN   104240268 A   12/2014
CN   104243916 A   12/2014
(Continued)

OTHER PUBLICATIONS

Communication dated Apr. 20, 2021 issued by the Russian Intellectual Property Office in counterpart Russian Application No. 2020132721.
(Continued)

*Primary Examiner* — Yassin Alata
(74) *Attorney, Agent, or Firm* — Sughrue Mion, PLLC

(57) ABSTRACT

A method for converting a frame rate of an input video is provided. The method includes performing a motion estimation by generating at least one motion field for at least one pair of frames of the input video, wherein the at least one motion field includes a set of motion vectors for each block of a first reference frame of the input video, the set of motion vectors indicating to a second reference frame of the input video, and preparing first data for a predetermined interpolation phase for each block of an interpolated frame, where the first data include at least one parameter for a pre-trained occlusion processing (OcC) convolutional neural network (CNN), the at least one parameter being obtained based on the at least one motion field.

15 Claims, 8 Drawing Sheets

(56) References Cited

U.S. PATENT DOCUMENTS

| | | | |
|---|---|---|---|
| 8,861,603 B2 | 10/2014 | Lertrattanapanich et al. | |
| 9,900,550 B1* | 2/2018 | Chou | G06T 7/248 |
| 10,242,447 B2 | 3/2019 | Rastgar | |
| 10,610,113 B2 | 4/2020 | Najarian et al. | |
| 10,776,688 B2 | 9/2020 | Jiang et al. | |
| 11,094,070 B2 | 8/2021 | Yang et al. | |
| 2009/0060042 A1 | 3/2009 | Lertrattanapanich et al. | |
| 2009/0074311 A1* | 3/2009 | Lee | G06T 7/223 |
| | | | 382/236 |
| 2010/0316125 A1 | 12/2010 | Chappalli et al. | |
| 2012/0033130 A1* | 2/2012 | Piek | H04N 19/40 |
| | | | 348/E7.003 |
| 2013/0170551 A1 | 7/2013 | Liu et al. | |
| 2014/0022453 A1* | 1/2014 | Slutsky | H04N 5/145 |
| | | | 348/441 |
| 2016/0277645 A1 | 9/2016 | Bitouk et al. | |
| 2016/0295232 A1 | 10/2016 | Yamamoto et al. | |
| 2018/0288433 A1* | 10/2018 | Oh | H04N 7/0127 |
| 2018/0374218 A1* | 12/2018 | Avidor | G06T 7/246 |
| 2019/0261000 A1* | 8/2019 | Oh | H04N 19/553 |
| 2021/0157460 A1 | 5/2021 | Kang et al. | |

FOREIGN PATENT DOCUMENTS

| | | |
|---|---|---|
| CN | 104751493 A | 7/2015 |
| CN | 106686472 A | 5/2017 |
| CN | 108460790 A | 8/2018 |
| CN | 109522793 A | 3/2019 |
| CN | 110084831 A | 8/2019 |
| CN | 110163887 A | 8/2019 |
| CN | 110163892 A | 8/2019 |
| CN | 107240120 B | 12/2019 |
| EP | 2 383 992 A2 | 11/2011 |
| RU | 2016 136 345 A | 3/2018 |
| RU | 2 747 965 C1 | 5/2021 |
| WO | 2012/040528 A1 | 3/2012 |
| WO | 2015/153569 A1 | 10/2015 |
| WO | 2018/057530 A1 | 3/2018 |

OTHER PUBLICATIONS

Search Report dated Apr. 8, 2021 issued by the Russian Intellectual Property Office in counterpart Russian Application No. 2020132721.
Olaf Ronneberger et al., "U-Net: Convolutional Networks for Biomedical Image Segmentation", Nov. 2015, 8 pages total.
Claus Nico Cordes et al., "Key Requirements for High Quality Picture-Rate Conversion", Invited Paper, SID Symposium Digest of Technical Papers, Jul. 2012, 1 page total (Abstract only).
Huaizu Jiang et al., "Super SloMo: High Quality Estimation of Multiple Intermediate Frames for Video Interpolation", arXiv:1712.00080v2, Jul. 2018, 12 pages total.
William Chen, "super slomo: High Quality Estimation of Multiple Intermediate Frames for Video Interpolation", Medium, Oct. 2018, 14 pages total.
Wenbo Bao et al., "MEMC-Net: Motion Estimation and Motion Compensation Driven Neural Network for Video Interpolation and Enhancement", IEEE Transactions on Pattern Analysis and Machine Intelligence, DOI 10.1109/TPAMI.2019.2941941, vol. 43, Issue 3, Sep. 17, 2019, 17 pages total.
Communication dated Jan. 4, 2022 issued by the International Searching Authority in counterpart Application No. PCT/KR2021/013597 (PCT/ISA/220, PCT/ISA/210, and PCT/ISA/237).

* cited by examiner

OCCLUSION PROCESSING FOR FRAME RATE CONVERSION USING DEEP LEARNING

CROSS-REFERENCE TO RELATED APPLICATION(S)

This application is a bypass continuation application of International Application PCT/KR2021/013597 filed on Oct. 5, 2021 in the Korean Intellectual Property Receiving Office, which claims priority to Russian Patent Application No. 2020132721, filed on Oct. 5, 2020, in the Russian Patent Office, the disclosures of which are incorporated herein in their entireties by reference.

TECHNICAL FIELD

The disclosure relates generally to video processing, and more specifically, to occlusion processing for frame rate conversion (FRC) using deep learning.

BACKGROUND ART

FRC may refer to temporal interpolation of video frames for increasing a video frame rate. FRC is the underlying technology for smooth video playback of common content such as user videos, movies or gameplay. Currently, the FRC algorithm is used in many applications, including mobile applications. In the FRC technology, occlusion processing is a key component to understand overlapping of the objects; and it allows correct interpolation in covered/uncovered areas of video frames. For a pair of frames, "occlusion" is an area of one frame (usually related to a background object) that was covered by a foreground object in the other frame.

In a typical example, an occlusion processing (OcC) unit receives motion estimation (ME) data for 2-4 frames closest to the interpolated position and prepares data for a motion compensated interpolation (MCI) frame. A MCI unit uses the closest 2 frames and the interpolation data to create the interpolated frame.

The following requirements are imposed on OcC: occlusion detection, high speed performance, ME noise robustness, correct handling of the frame and object borders, the possibility of using in mobile devices and in real-time, and low power consumption. At the same time, there are a number of factors that negatively affect the performance of the OcC algorithm, such as performance and power limitations of the device itself, where the OcC is used, noisy ME algorithm, complex scenes. As a result, it can lead to battery life decreasing, to non-real time performance, to the appearance of interpolation artifacts and a halo of objects in the frame.

In conventional FRC algorithms, OcC is a manually created algorithm that has many internal empirically set parameters and rules.

In one example, the following sequence of steps is used for FRC: an input video is processed in a motion estimation unit (block-wise/pixel-wise), then a manually created OcC algorithm is executed (mostly block-wise), then data is prepared for motion compensation (block-wise). Thereafter motion compensation is performed (block-wise/pixel-wise) and the resulting output video is output. This example has certain disadvantages, such as a halo around objects relative to a background, inaccurate processing of frame borders, the impossibility of using an neural processing unit (NPU) accelerator.

Another example uses the following sequence of steps for FRC: an input video is processed in an optical flow computation unit using a convolutional neural network (CNN) (pixel-wise), then the optical flow is interpolated to a given phase using the CNN, and visibility maps are calculated (pixel-wise). Thereafter, motion compensation (MC) is performed (pixel-wise), and the resulting output video is output. This example has certain drawbacks, such as high computational complexity (<10 frames per second (FPS) on a graphics processing unit (GPU)), and the fact that pixel-wise displacements can distort interpolated images. In this approach, both ME and MC use CNN learning architectures with pixel-wise (per-pixel) processing. MC has an additional parameter for predicting a frame in a given phase (0<t<1) between original frames. Because the CNN operates directly with full pixel data, computational load is very high, that requires a high-end desktop graphics GPUs.

DISCLOSURE

Technical Solution

Provided is a deep leaning approach, which can be used to train the OcC algorithm with the disclosed synthetic and natural FRC dataset.

Additional aspects will be set forth in part in the description which follows and, in part, will be apparent from the description, or may be learned by practice of the presented embodiments.

In accordance with an aspect of the disclosure, a method for converting a frame rate of an input video may include performing a motion estimation by generating at least one motion field for at least one pair of frames of the input video, wherein the at least one motion field includes a set of motion vectors for each block of a first reference frame of the input video, the set of motion vectors indicating to a second reference frame of the input video, preparing first data for a predetermined interpolation phase for each block of an interpolated frame, where the first data include at least one parameter for a pre-trained OcC CNN, the at least one parameter being obtained based on the at least one motion field, performing occlusion correction with the OcC CNN for each block of the interpolated frame by predicting weights associated with the set of motion vectors based on the prepared first data, and performing motion compensation for each block or for each pixel of the interpolated frame by processing data from the OcC CNN.

In accordance with an aspect of the disclosure, an apparatus for converting a frame rate of an input video may include a memory storing instructions and a processor configured to execute the instructions to perform a motion estimation by generating at least one motion field for at least one pair of frames of the input video, wherein the at least one motion field includes a set of motion vectors for each block of a first reference frame of the input video, the set of motion vectors indicating to a second reference frame of the input video, prepare first data for a predetermined interpolation phase for each block of an interpolated frame, where the first data include at least one parameter for a pre-trained OcC CNN, the at least one parameter being obtained based on the at least one motion field, perform occlusion correction with the OcC CNN for each block of the interpolated frame by predicting weights associated with the set of motion vectors based on the prepared first data, and perform motion compensation for each block or for each pixel of the interpolated frame by processing data from the OcC CNN.

DESCRIPTION OF DRAWINGS

The above and other aspects, features, and advantages of certain embodiments of the present disclosure will be more apparent from the following description taken in conjunction with the accompanying drawings, in which.

MODE FOR INVENTION

Figure 1:
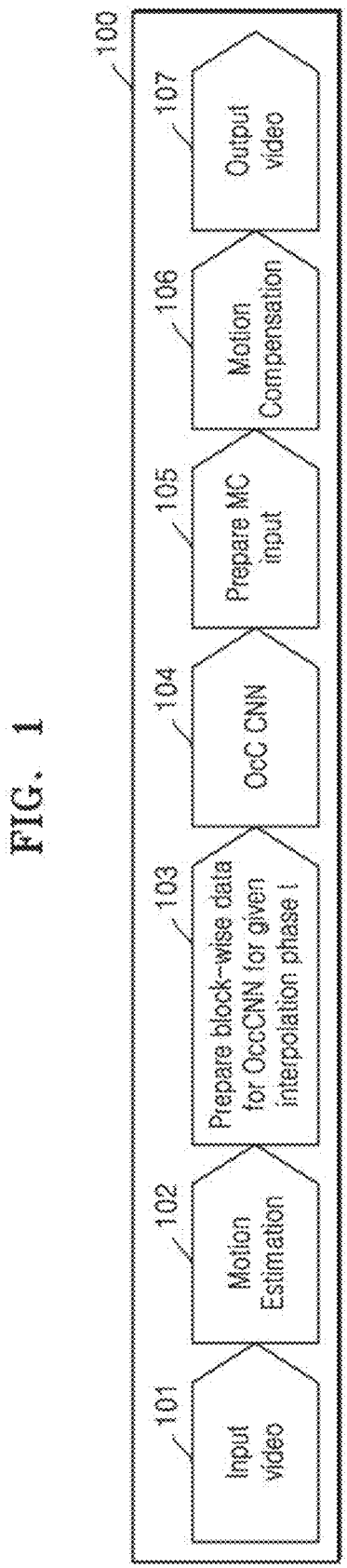
FIG. 1 is a diagram of a flowchart of a method for performing FRC according to an embodiment.

The present disclosure provides a significant decreasing of the halo caused by an occlusion resulting from FRC, increasing of PSNR, a reduced number of computations (comparable with a manually created OcC algorithm, and much lower than FRC with a pixel-wise CNN), increasing of OcC processing accuracy due to fine tuning for a particular scenario by selecting datasets for a particular use case.

Aspects of the disclosure are to address at least the above-mentioned problems and/or disadvantages and to provide at least the advantages described below.

According to an aspect of the present disclosure, a method for converting a frame rate of an input video may include performing a motion estimation by generating at least one motion field for at least one pair of frames of the input video, wherein the at least one motion field includes a set of motion vectors for each block of a first reference frame of the input video, the set of motion vectors indicating to a second reference frame of the input video, preparing first data for a predetermined interpolation phase for each block of an interpolated frame, wherein the first data include at least one parameter for a pre-trained OcC CNN, the at least one parameter being obtained based on the at least one motion field, performing occlusion correction with the OcC CNN for each block of the interpolated frame by predicting weights associated with the set of motion vectors based on the prepared first data, and performing motion compensation for each block or for each pixel of the interpolated frame by processing data from the OcC CNN.

In an embodiment, the at least one motion field for the at least one pair of frames of the input video includes at least one of a current forward motion field, a current backward motion field, a previous backward motion field, or a next forward motion field.

In an embodiment, the first data includes a projected motion vector for each block of the interpolated frame, and the projected motion vector in a current block in the interpolated frame is a closest vector among motion field vectors for a given pair of frames.

In an embodiment, the first data includes a distance to a projected block for each block of the interpolated frame, and the distance to the projected block indicates a distance between a center of a current block in the interpolated frame and a center of the projected block.

In an embodiment, the first data includes a confidence measure for each block of the interpolated frame, and the confidence measure characterizes a similarity between a block of the first reference frame, from which a considered motion vector originates, and a corresponding block of the second reference frame, to which the considered motion vector indicates.

In an embodiment, the first data includes a texturedness measure for each block of the interpolated frame, and the texturedness measure indicates how much a current block in the interpolated frame differs from a uniform background.

In an embodiment, the at least one motion field for the at least one pair of frames of the input video includes a current forward motion field and a current backward motion field, the first data includes a block coverage map for each block of the interpolated frame for the current forward motion field and the current backward motion field, and the block coverage map shows how many pixels of a current block in an interpolated frame grid were covered by all projected blocks from the first reference frame.

In an embodiment, the first data includes a distance to a frame border for each block of the interpolated frame, and the distance to the frame border indicates a minimum distance among distances from a current block in an interpolated frame grid to an edge of a frame in horizontal and vertical directions in block units.

In an embodiment, the method further includes training the CNN based on minimizing a loss function when processing a synthetic dataset used for pre-training and a natural dataset used to fine-tune the CNN, where video sequences from each dataset are preliminarily decimated, and then missing frames are interpolated and compared with original frames extracted during the preliminary decimation for use as a ground truth, and the loss function reflects a difference between an actual interpolated frame and an original frame as a real number.

In an embodiment, the training is performed using a cluster inertia loss function that is used to predict two motion vectors for each block according to a hypothesis in which a block is in an occlusion area and includes both a foreground object, to which a cluster of motion vectors of a foreground object corresponds, and a background object, to which a cluster of motion vectors of a background object corresponds.

In an embodiment, the training uses a blockiness loss function that indicates a degree of blockiness artifacts in the interpolated frame.

In an embodiment, the occlusion correction with the OcC CNN for each block of the interpolated frame is further performed by predicting weights characterizing an occlusion type in a given block according to a motion hypothesis, based on the prepared first data and the motion estimation.

In an embodiment, the occlusion correction the occlusion correction with the OcC CNN for each block of the interpolated frame is further performed by predicting weights characterizing a degree of confidence to a hypothesis reliability value of a given hypothesis calculated based on the first reference frame and the second reference frame, and a correction factor for the hypotheses reliability value.

In an embodiment, the method further includes preparing second data for each block of the interpolated frame, where the second data is used for motion compensation, and the preparing the second data includes calculating at least one motion hypothesis based on motion vectors for blocks in a local neighborhood of a current interpolated block.

In an embodiment, the motion compensation includes generating at least one predictor frame for each motion hypothesis based on neighbor reference video frames using corresponding obtained motion vectors and the predicted weights, and determining the interpolated frame based on the at least one predictor frame.

According to an aspect of the present disclosure, an apparatus for converting a frame rate of an input video may include a memory storing instructions and a processor configured to execute the instructions to perform a motion estimation by generating at least one motion field for at least one pair of frames of the input video, wherein the at least one motion field includes a set of motion vectors for each block of a first reference frame of the input video, the set of motion vectors indicating to a second reference frame of the input video, prepare first data for a predetermined interpolation phase for each block of an interpolated frame, wherein the first data include at least one parameter for a pre-trained OcC CNN, the at least one parameter being obtained based on the at least one motion field, perform occlusion correction with the OcC CNN for each block of the interpolated frame by predicting weights associated with the set of motion vectors based on the prepared first data, and perform motion compensation for each block or for each pixel of the interpolated frame by processing data from the OcC CNN.

FIG. 1 is a diagram of a flowchart 100 of a method for performing FRC according to an embodiment. In particular, firstly, a motion estimation 102 is performed (block-wise/pixel-wise) using an input video 101. A block-wise preparation 103 of data for an OcC CNN is performed for a predetermined interpolation phase t (mostly block-wise). An occlusion correction 104 is performed with the OcC CNN (block-wise). Data for a motion compensation is prepared 105 (block-wise). The motion compensation 106 is performed (block-wise/pixel-wise), and the resulting output video 107 is output.

"Block-wise processing" may refer to an image including pixels being divided into equal-sized rectangular or square blocks. For example, a 720×1280 pixel frame is divided into 8×8 pixel blocks, resulting in a 90×160 block frame. Further, the value of any variable associated with an individual block is assumed to be the same for all pixels within this block. Such an approach allows processing information not from each pixel, but only from each block, which leads to a significant decrease in the amount of processed data compared to the completely pixel-wise processing.

The input video 101 including original (reference) frames can arrive, for example, from a camera, an image processor, a video decoder, the Internet. The output video 107 includes the original frames and the interpolated frames obtained by FRC. The output video can pass, for example, to a video encoder for obtaining a file with the increased FPS or to a screen for playing video with the increased FPS.

If there is a pair of reference frames having numbers (or moments in time) N and (N+1), then it is possible to interpolate any number of frames between this pair of frames. For example, if it is necessary to double the frame rate, then it is necessary to interpolate one frame at time N+0.5; if fourfold, then at times N+0.25, N+0.5 and N+0.75. 0.25, 0.5 and 0.75—these are called the phase (a) of the interpolated frame (that is, the phase in the literal sense, if we take the reference frame period as a unit). Some embodiments of the present disclosure provide network training for one phase (0.5). It should be appreciated that in order to interpolate each phase, it is necessary to have a network that is trained (learned) for that particular phase. It is possible to generate inputs for the network, which will include information for all required phases (the number of outputs should be increased accordingly).

The disclosure herein preforms the OcC CNN step using only block-wise data, use input data for the OcC CNN with a small receptive field, as well as use the OcC output obtained by the OcC CNN for high quality MCI.

Motion Estimation (Operation 102)

In operation 102, a pair of consecutive reference (key) frames is supplied to the motion estimation unit. The provided ME algorithm generates a motion vector for each block of the first reference frame, which indicates to the second reference frame.

A motion vector (MV) is an offset (two coordinates) between blocks of the current and another frame. This offset can have either pixel precision or fractional pixel precision. A motion field is a set of motion vectors, where each of the motion vectors is matched either to each pixel (dense motion field) or to a block of pixels (usually a square or rectangle of neighbor pixels) of the current frame. In the present disclosure, motion vectors belonging to blocks are used, and correspondingly, block motion fields are used. For example, if a 720×1280 pixel frame is divided into blocks each having a size of 8×8 pixels, then the frame size is 90×160 blocks, and this is how many motion vectors the motion field has for such a frame.

The motion vectors indicate to some other frame. The motion field may imply the presence of two frames—the current frame and some other (for example, the next in time or the previous in time). If the frames captured by a camera are numbered in ascending order, then for a pair of frames N and N+1, a forward motion field will be a set of motion vectors for the current frame N, which indicate to the other frame N+1 (it is possible to compensate frame N with a simple motion compensation algorithm). A backward motion field will be a set of motion vectors for the current frame N+1, which indicate to the other frame N (it is possible to compensate frame N+1 with a simple motion compensation algorithm). In the present disclosure, both of these motion fields can be a result of operation of the motion estimation algorithm between the frames N and N+1.

If there is a pair of reference frames at times N and N+1, and it is necessary to interpolate a frame at time N+a (for example, N+0.5), then the pair of reference frames N and N+1 is called as current, the pair N−1 and N is called as previous, the pair N+1 and N+2 is called as next. Motion fields between frames of each pair are named accordingly.

Figure 2:
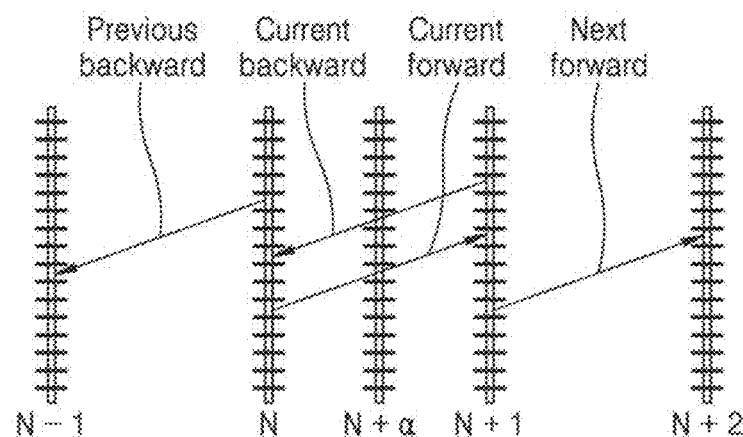
FIG. 2 is a diagram of motion field vectors for different pairs of frames according to an embodiment.

FIG. 2 is a diagram of motion field vectors for different pairs of frames according to an embodiment. For example, FIG. 2 shows a part of a column of blocks in a frame, which is conditionally separated by rows (a regular grid), for each of frames N−1, N, N+1 and N+2 of the input video sequence, as well as for the assumed interpolated frame N+α. The motion vectors characterize the offset of blocks between the frames as two coordinates: horizontally and vertically. For ease of understanding, FIG. 2 shows only one motion vector for each frame, whereas such vectors are estimated for each block in the frame. The set of motion vectors for the frame makes up the motion field. Further, the aforementioned forward and backward motion fields for a pair of frames N and N+1 are forward and backward motion fields for the current pair of frames (i.e., current forward and backward motion fields). In the present disclosure, forward and backward motion fields may be used for each of the frames N and N+1. Therefore, the output of the motion estimation step may additionally be a backward motion field for the previous pair of frames N−1 and N (i.e., a previous backward motion field) and a forward motion field for the next pair of frames N+1 and N+2 (i.e., a next forward motion field).

In an embodiment, L (number of fields)=1 motion field is used (for example, a current backward motion field). In other embodiments, L may be equal to, for example, 2 or more.

Preparing Data for OcC CNN for Predetermined Interpolation Phase (Operation 103)

Conventional neural networks for occlusion correction use full-resolution data (that is, every pixel is considered), what leads to very high computational complexity. To reduce computational costs (number of operations), the disclosure herein extracts features from images block-wise and use them as a CNN input. However, a simple transition to a block-wise mode with data transmission directly and only from the motion estimation unit to the neural network and then to the motion compensation unit can lead to errors up to a possible deterioration in image quality, or may not be sufficient to reduce computational costs.

For example, despite block-wise processing in a motion estimation unit, a simple transmission of its output data (a set of candidate vectors) to a neural network may require a neural network with a large receptive field, which would consider in its work all possible or relatively large space in a frame in the process of identifying which blocks may be influenced by a particular motion vector, especially if there are relatively large vectors. A receptive field in convolutional neural networks is an area in the input space of a neural network that can influence on a specific unit in the output space. For example, assume there is a convolutional neural network that transforms an N*N input tensor into an output tensor of the same size. If the convolutional network is small, then the value of the element (0, 0) of the input tensor does not influence in any way on the value of the element (N, N) of the output tensor. Thus, the input tensor element (0, 0) is outside the receptive field for the output tensor element (N, N). A decrease in the receptive field will lead to a decrease in the number or size of convolutions in the neural network and, thereby, to a decrease in the number of operations.

Accordingly, in order to reduce the computational cost, improve the accuracy of the OcC CNN and motion compensation unit operation, and to improve image quality, it is desirable to inform for the neural network (and subsequently for the motion compensation unit) more parameters in addition to the above indicated results of the motion estimation algorithm.

Next, operation 103 will be described, in which data is prepared for the OcC CNN for a predetermined interpolation phase.

Table 1 summarizes parameters that may be included in block-wise output data of operation 103 in an embodiment of the present disclosure.

TABLE 1

| Name | Description | Quality improvement |
|---|---|---|
| A. Projected MV | A motion vector projected from a reference frame to an interpolated frame | — |
| B. Distance to projected block | A distance characterizing the projected motion vector | +0.034 dB |
| C. Confidence measure | An indicator of the accuracy of matching the selected block in the first reference frame with the selected block in the second reference frame | +0.030 dB |
| D. Texture | A measure of texturedness of the initial block for the projected MV | +0.030 dB |
| E. Block coverage measure | A block coverage map at the interpolated position | +0.014 dB |
| F. Distance to frame border | A distance to the frame border | +0.322 dB |

The right column in Table 1 shows how the image quality in the interpolated frame changes by applying each of the specified parameters. Next, the contents of Table 1 will be described in more detail.

A. Projected MV.

The disclosed motion estimation algorithm described in operation 102 above generates a vector for each block of the first reference frame that indicates to the second reference frame. The blocks in the first reference frame are arranged on a regular grid.

Figure 3:
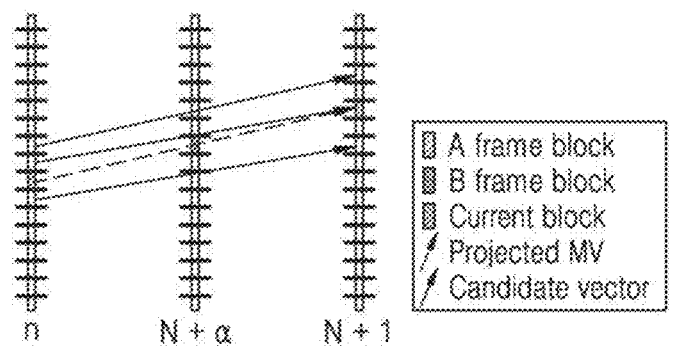
FIG. 3 is a diagram of making of the projected vector of the current forward motion field according to an embodiment.

FIG. 3 is a diagram of making of the projected vector of the current forward motion field according to an embodiment. For example, in FIG. 3, similar to FIG. 2, a part of a column of blocks in a frame is shown, which is conditionally separated by rows (a regular grid), for each of frames N (designated as frame A) and N+1 (designated as frame B) of the input video sequence, as well as for the assumed interpolated frame N+a (for example, N+0.5). Each of the 4 neighboring blocks in frame A has a corresponding estimated motion vector, which indicates where the block is displaced in frame B relative to frame A. Vectors for the remaining blocks are not shown for ease of understanding and to avoid cluttering of the drawing.

To reduce the receptive field of the neural network, it is necessary to obtain vectors on the grid of the interpolated frame N+α. For this, for example, from the current forward motion field, it is necessary to take a block of this field and move (project) it along the motion vector estimated for this block into the plane of the interpolated frame. In this procedure, often there may be situations where a block displaced from the reference frame by the corresponding motion vector will not hit block-to-block in the regular grid of blocks of the interpolated frame, because the vectors have pixel resolution, i.e. the projected block partially covers 2 or 4 blocks of the regular grid of the interpolated frame.

However, the motion compensation algorithm, which will be described in more detail later in operation 106, requires vectors that belong to blocks located regularly on the interpolated frame grid. To solve this problem, it is disclosed herein to save in each covered block of the interpolated frame the distance from the origin (the pixel coordinates of the upper left corner) of the projected block up to the origin of the covered block; and finally (when all blocks are projected) the current considered block in the grid of the interpolated frame will be assigned with the vector, the projected block from which lies closest to this current considered block. It is disclosed to designate such vector as "a projected motion vector" (projected MV). Accordingly, the projected MV in the current block in the interpolated frame is the closest vector passing near the current block. Thus, a set of projected MVs will constitute the projected motion field in the grid of blocks of the interpolated frame.

Usage of the projected MV allows utilizing a CNN with the significantly reduced receptive field, because the increased number of the processed MVs does not increase the CNN receptive field. Thus, the total number of operations in the FRC method is reduced.

B. Distance to Projected Block.

The distance to the projected block is the distance between the center of the current block in the interpolated frame and the center of the projected block for the considered motion vector. This information is also useful for understanding if the predicted MV is reliable. Reliable vectors have a short distance to the projected block.

C. Confidence Measure.

The confidence measure is a characteristic of the similarity between a block of frame A and a block of frame B (for example, a sum of absolute differences (SAD)). In other words, this is a number that characterizes the accuracy of the found vector. This information helps to understand how the motion vector between frames A and B is reliable.

D. Texture.

Texture (or a texturedness measure) shows how much a block of an image has an expressed texture (that is, how much it differs from a uniform background). The texturedness measure is calculated for the block where the projected vector originated. It can be calculated as the standard deviation of the luminance levels of the local image block in the block of frame A (this corresponds to the local signal strength of the image). This information is useful when it is necessary to understand whether the confidence measure is reliable or not (as a rough estimate or normalization of the confidence measure).

E. Block Coverage Measure.

The block coverage measure shows how many pixels of the current block in the interpolated frame grid were "covered" by all projected blocks from the reference frame for one motion field. For this parameter, it does not matter how close the block from the reference frame was projected to the beginning of the block in the interpolated frame grid: if at least one pixel was covered, then it will be considered. At the time, only two field are used, whose vectors "pass" through the interpolated frame: the current forward motion field and the current backward motion field. The block coverage map is calculated separately for the current forward motion field and for the current backward motion field.

Figure 4:
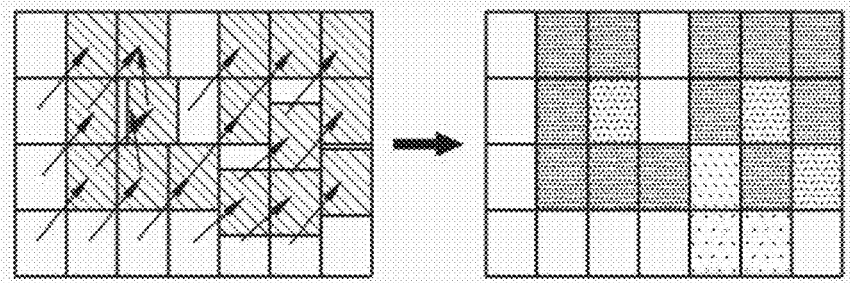
FIG. 4 is a diagram of forming of a block coverage map according to an embodiment.

FIG. 4 is a diagram of forming of a block coverage map according to an embodiment. For the selected interpolation time position (phase) a, the estimated motion vectors originating from the reference frame are multiplied by the normalized time distance to the interpolated time position a (i.e., truncated). Next, the positions of all original blocks from the reference frame moved to the corresponding obtained normalized motion vectors are determined on the interpolated frame. Then each block in the regular grid of the interpolated frame is marked according to how many of its pixels were covered by at least one of the moved original blocks (that is, each block of the interpolated frame is assigned with the number of covered pixels). For example, for 8×8-pixel blocks, this will be a value from 0 to 64. Accordingly, the block coverage map is built.

The resulting block coverage map is some estimate, interpolation of the occlusion map. This information helps to better understand where the occlusion is and what the type of occlusion is, which helps to reduce the halo effect around objects.

F. Frame Border Distance.

In order to improve the quality of frame processing, especially in the area of frame borders, it is disclosed herein to mark the blocks near the frame border so that CNN can easily identify them. For this, it is disclosed to use a parameter characterizing the distance to frame borders, which shows the distance from the current block in the interpolated frame grid to the edge of the frame in horizontal and vertical directions (in block units). In particular, the minimum among four distances to each edge of the frame can be selected as this parameter. In addition, this distance can be limited from above, depending on the receptive field.

Figure 5:
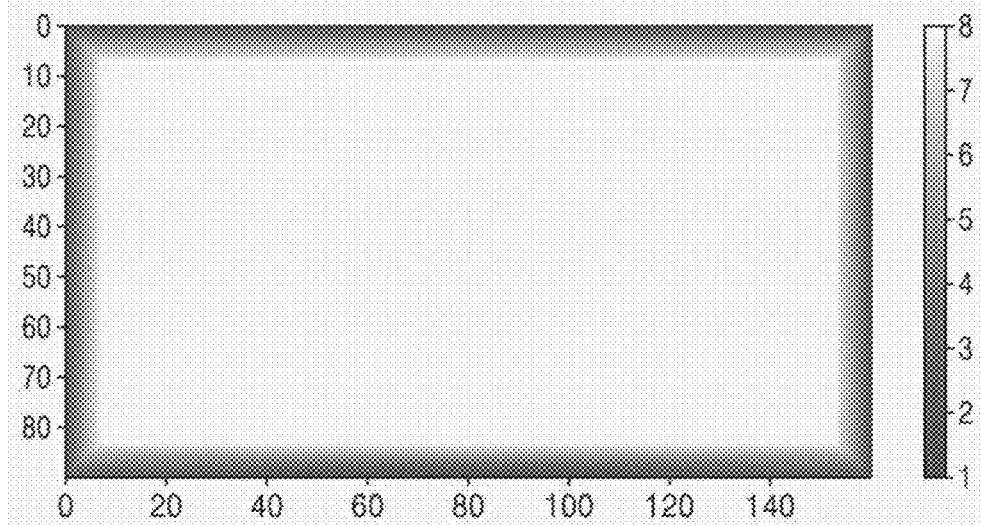
FIG. 5 is a diagram of a frame in which blocks at the frame border are assigned with the corresponding distances according to an embodiment.

FIG. 5 is a diagram of a frame in which blocks at the frame border are assigned with the corresponding distances according to an embodiment. In the example on FIG. 5, frame border distances are shown for a 720×1280 HD frame including 90×160 blocks, each including 8×8 pixels. The block on the edge (the first from the edge) has a value of 1, the next block toward the frame depth has a value of 2, and so on up to the limit (for example, up to 8, as shown in FIG. 5).

The use of data regarding frame border distances provides the improved quality of interpolated frames in the areas close to the edges compared to other CNN approaches and manually created OcC algorithms.

EXAMPLE

Thus, in an exemplary embodiment, if 4 motion fields were generated in the motion estimation operation 102, and all of the above parameters were used in the OcC CNN data preparation operation 103, then the output of operation 103 would be the following data: parameters A (the projected motion vectors, which are characterized by two numbers in each block (coordinates)), B, C, D for each vector of each motion field (that is, 4 times), parameters E for each vector of the current forward and backward motion fields (that is, 2 times), as well as parameter F (1 time). Accordingly, (A+B+C+D)*4+E*2+F*1=(2+1+1+1)*4+1*2+1*1=23 matrices of numbers are obtained as a result of operation 103.

OTHER EMBODIMENTS

In the above example, it is shown for ease of understanding that all parameters A to F are used. However, other combinations of parameters are possible. According to a number of experiments, during which the influence of the absence of each of the parameters on the PSNR indicator was investigated. Table 1 shows the results of these experiments in the right column. Accordingly, if algorithm optimization is necessary for a particular application when searching for a compromise between the computing performance and image quality, it is possible to discard some parameters. It should be noted here that parameter A may be used to achieve the aims of the present disclosure. Thus, in one embodiment, the data regarding parameter A calculated in operation 103 is supplied to the input of the neural network.

Summarizing the above, it can be noted that due to the preliminary preparation of the input data, the minimum required receptive field and the number of CNN layers (the CNN receptive field and the number of layers do not depend on the input data) are decreased, and a halo in the interpolated frame is also decreased. As a result, both improved interpolation quality due to the diversified input data and the ability to perform this FRC method in real time on a mobile device are provided.

Correction of Occlusions with OcC CNN (Operation 104)

Next, operation 104 will be described, in which an occlusion correction is performed using a neural network. The occlusion correction generally includes predicting weights that are associated with the detection and description of occlusions for each block and which will be subsequently used in the disclosed FRC method for motion compensation in order to obtain an interpolated frame.

Namely, an OcC CNN can predict the following weights for each block: (1) weights for the input projected motion vectors in a local neighborhood of the current interpolated block, (2) weights MIX characterizing the occlusion type in the given block according to each motion hypothesis, (3) weights Confidence_WSAD characterizing the degree of confidence to the reliability value of the given hypothesis, which are calculated based on the reference frames, and (4) correction coefficients WCNN for each reliability value of the hypothesis.

Next, for ease of understanding, a particular example will be described, but it should be noted that these principles apply to other similar implementations.

Figure 6:
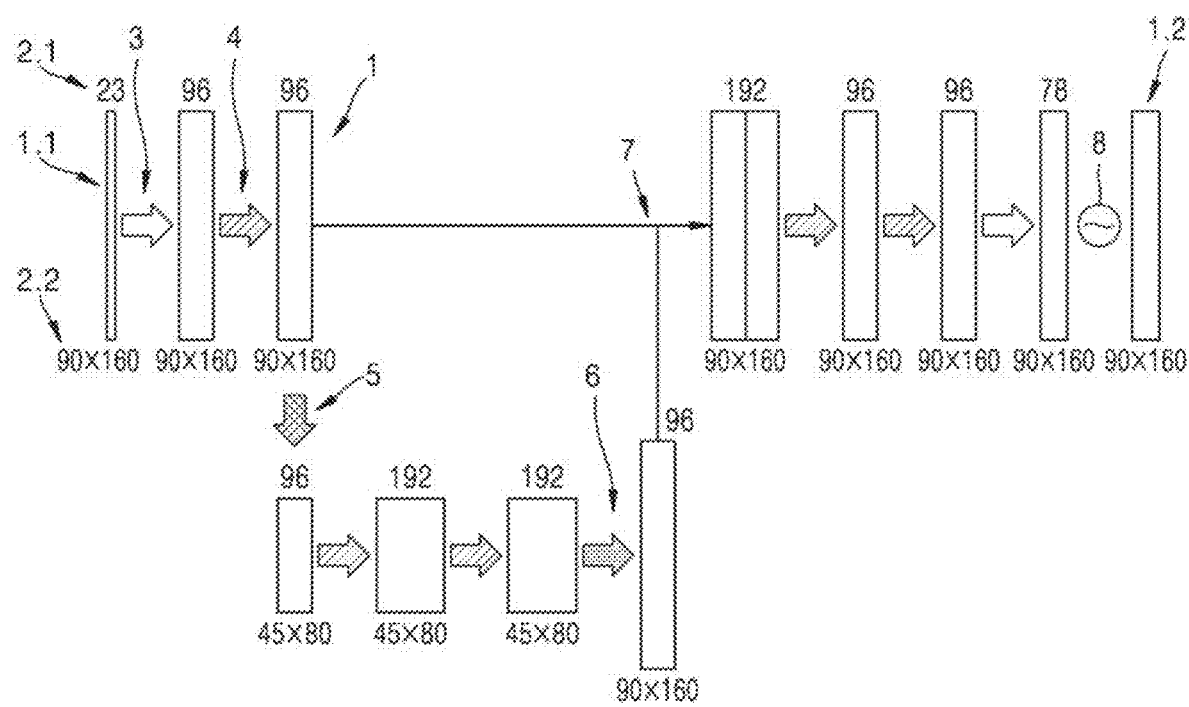
FIG. 6 is a diagram of an example of a possible convolutional neural network architecture according to an embodiment.

The present disclosure provides a simplified architecture suitable for the OcC CNN task (FIG. 6). To work in real time, it is necessary that the number of convolutional layers be small, and most of the convolutions should be separated by depth.

FIG. 6 is a diagram of an example of a possible convolutional neural network architecture according to an embodiment. FIG. 6 schematically illustrates an example of a possible architecture of a convolutional neural network, which achieves the following aims: a) to detect and correct occlusions, and b) to have comparatively small computational complexity. The principle of operation of the disclosed neural network is generally similar to the principle of operation of the above-mentioned U-Net with the difference that the present disclosure performs block-wise processing and applies a set of parameters from the preparing operation 103.

OcC CNN receives an input data array 1.1 with the number of channels 2.1 in the data array equal to 23 and the spatial size 2.2 of the data array equal to 90×160. With respect to the input data array 1.1, the convolution and linear rectification function 3 (for example, rectified linear unit (ReLU)) are sequentially applied, as a result of which the number of channels 2.1 in the array is increased to 96. Then, the depth-wise convolution and linear rectification function 4 (for example, ReLU) are sequentially applied on the obtained array. Thus, the transformed data array 1 is obtained with the number of channels of 96 and the spatial size of 90×160.

The "max pooling" operation 5 is applied to the obtained transformed array 1, which reduces the spatial size of the data array by 2 times for each coordinate, as a result of which the spatial size becomes 45×80. After that, operation 4 is performed twice on the obtained array, as a result of which the number of channels increases to 192. Next, the bilinear interpolation and depth-wise convolution 6 are sequentially applied. Thus, the interpolated data array is obtained with the number of channels of 96 and the spatial size of 90×160.

Then, with respect to the interpolated array and with respect to the transformed array 1, the operation 7 of concatenating the two data arrays is performed, which results in the concatenated array with the number of channels of 192 and the spatial size of 90×160. After that, the operation 4 is performed twice on the obtained concatenated array, as a result of which the number of channels is reduced to 96. Then the obtained array is subjected to operation 3, as a result of which the number of channels is reduced to 78. A sigmoidal function 8 is applied to the obtained array, the result of which is the output data array 1.2 with the number of channels of 78 and the spatial size of 90×160.

Thus, in the exemplary embodiment, 78 numbers for each of the blocks in the interpolated frame will be obtained as a result of operation 104 of FIG. 1. These numbers can also be called weights (weight factors).

Such OcC CNN can be used in real time on a mobile device.

OcC CNN Training

To train a CNN, it is disclosed herein to use synthetic (artificial) and natural datasets. The synthetic dataset is used to pre-train the CNN. It includes a textured background and foreground moving relative to each other (for example, 9600 samples).

Figure 7:
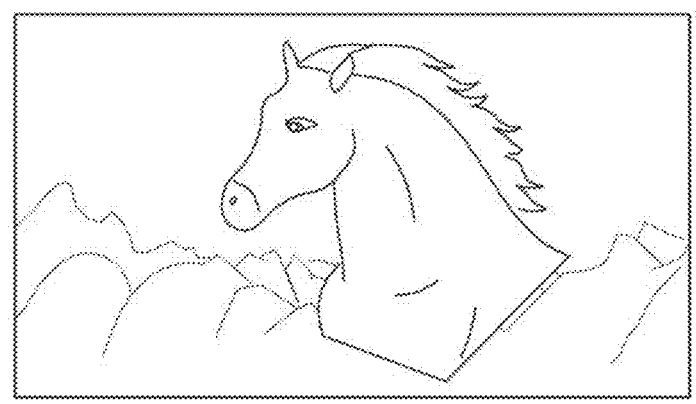
FIG. 7 is a diagram of an example of a synthetic frame according to an embodiment.

FIG. 7 is a diagram of an example of a synthetic frame according to an embodiment. The natural dataset is used to fine-tune the CNN. It includes various videos captured with the camera of the target device (for example, 21819 samples).

When training for converting the frame rate in 2 times (×2) for each video in the dataset, uneven frames are removed and used as a truth data (ground truth) for comparison with the interpolated frame.

The process of training a neural network includes minimizing a loss function on a given dataset. The loss function (or error function) is a function that reflects the difference between the actual output of the model (an interpolated frame) and the truth output of the model (a real frame) in a real number. The larger this number, the greater the difference. A neural network can be trained, for example, using the Stochastic Gradient Descent (SGD) method. In this case, the entire dataset is divided into small parts (so-called batches). After that, one step of gradient descent is performed sequentially on each batch of the dataset. Such process can be repeated many times on the entire dataset. Each iteration of the dataset is called an epoch. It is necessary to perform N epochs on a given dataset to train the model. The learning rate, for example, in the stochastic gradient descent method is the proportionality coefficient between the gradient value and the step size of the gradient descent.

An example of training is shown below in Table 2.

TABLE 2

| Training phase | 1 | 2 | 3 | 4 |
|---|---|---|---|---|
| Dataset | Synthetic | Synthetic | Natural | Natural |
| Number of epochs | 64 | 64 | 32 | 32 |
| Loss function applied | L1 Cluster inertia | L1 | L1 Cluster inertia | L1 Blockiness |

TABLE 2-continued

| Training phase | 1 | 2 | 3 | 4 |
|---|---|---|---|---|
| Adam Optimization Learning rate | 10e−4 constant | 10e−4 constant | 10e−4 constant | 10e−4 decreasing |

In an embodiment of the present disclosure, the typical loss function L1 is used to train the CNN to compare the interpolated frame with the ground truth.

$$L1 = M_{i,j}(|I_{i,j} - GT_{i,j}|)$$

where $M_{i,j}(\ldots)$ is the arithmetic mean over the lower indices i,j $I_{i,j}$ is the value of the pixel with number i,j in the interpolated image $GT_{i,j}$ is the value of the pixel with number i,j in the ground truth.

Additionally, new loss functions can be used:

The cluster inertia loss function (Cluster Inertia) obtained from the use of the manually created algorithm. It is used to force the CNN to use a 2-motion hypothesis.

In more detail, in one of the possible implementations of the present algorithm, two motion hypotheses are used. Thus, the CNN has to predict two motion vectors for each block (in the above example, to obtain one vector, the CNN weighs 36 candidate vectors). It is assumed that a block at the boundary of the occlusion area may include both a foreground object and a background object. Then, motion vectors, which are candidates for this block (36 vectors) can be divided into two clusters: a cluster of the background object motion vectors and a cluster of the foreground object motion vectors. Each of these clusters is formed from a subset of 36 candidate vectors. The Cluster Inertia loss function forces the CNN to prefer predicting of two vectors so that they belong to different clusters. In this example, this increases the PSNR by 0.038 dB.

An example of calculating the cluster inertia loss function is presented below:

$$\text{Cluster\_inertia} = \log(1 + \text{Dist\_in\_cluster}_0 + \text{Dist\_in\_cluster}_1) \cdot \log(1 + \text{Dist\_between\_clusters})$$

where $$\text{Dist\_in\_cluster}_0 = M_{i,l,m}(\|mv_{0\ l,m} - mv_{i\ l,m}\| \cdot p_{i\ l,m})$$

$$\text{Dist\_in\_cluster}_1 = M_{i,l,m}(\|mv_{1\ l,m} - mv_{i\ l,m}\|(1 - p_{i\ l,m}))$$

$$\text{Dist\_in\_clusters} = M_{l,m}(\|mv_{0\ l,m} - mv_{1\ l,m}\|)$$

$\|\ldots\|$ is a norm $mv_{i\ l,m}$ is a set of candidate vectors in a block with coordinates l, m (for example, it includes 36 projected vectors for a neighborhood of the block l, m having a size of 3×3 from each of the 4 projected motion fields)

$mv_{0\ l,m}$ and $mv_{1\ l,m}$ are the predicted vectors in the block with coordinates l, m (they are calculated in this loss function in the same way as in operation 105 of FIG. 1 described below, using 72 output weights of the network)

$p_{i\ l,m}$ is the likelihood that the vector $mv_{i\ l,m}$ belongs to a cluster$_0$ (this likelihood is an internal network parameter that is calculated by the network itself and not used anywhere else, apart from this loss function)

Dist_in_cluster and Dist_between_clusters are the characteristic distance within a cluster and between two clusters.

The blockiness loss function (Blockiness) is used for the decrease blockiness artifacts in the interpolated frame. In this example, this increases the PSNR by 0.014 dB.

An example of calculating the blockiness loss function is presented below:

$$\text{Blockiness} = (\text{Blockiness}\_h + \text{Blockiness}\_v)/2$$

where $$\text{Blockiness}\_h\_I_{l,m} = (I_{l,m \cdot bs} - I_{l,m \cdot bs+1}),$$

$$l = 1 \ldots H, m = 1 \ldots \frac{W}{bs} - 1$$

$$\text{Blockiness}\_h\_GT_{l,m} = (GT_{l,m \cdot bs} - GT_{l,m \cdot bs+1}),$$

$$l = 1 \ldots H, m = 1 \ldots \frac{W}{bs} - 1$$

$$\text{Blockiness}\_h = M_{l,m}(|\text{Blockiness}\_h\_I_{l,m}| - |\text{Blockiness}\_h\_GT_{l,m}|)$$

$$\text{Blockiness}\_v\_I_{l,m} = (|I_{l \cdot bs,m} - I_{l \cdot bs+1,m}|),$$

$$l = 1 \ldots \frac{H}{bs} - 1, m = 1 \ldots W$$

$$\text{Blockiness}\_v\_GT_{l,m} = (|GT_{l \cdot bs,m} - GT_{l \cdot bs+1,m}|),$$

$$l = 1 \ldots \frac{H}{bs} - 1, m = 1 \ldots W$$

$$\text{Blockiness}\_v = M_{l,m}(|\text{Blockiness}\_v\_I_{l,m}| - |\text{Blockiness}\_v\_GT_{l,m}|)$$

H, W—image height and width in pixels, respectively bs—block size in pixels

In this case, counting of the number of blocks and pixels when calculating this loss function starts from 1.

Accordingly, the use of the synthetic dataset results in increasing a total PSNR of 0.053 dB in this example. As a result, it provides a common improvement in quality, reduction of blockiness artifacts, and improvement of the object boundary.

Preparing Data for Motion Compensation (Operation 105)

As mentioned above, due to a transition to the block-wise processing of frames, in the general case it can be necessary to report more data to the motion compensation block in addition to the results of the occlusion correction algorithm.

The following describes how data for MC is prepared in operation 105.

In the present disclosure, in the FRC algorithm, each OcC CNN output block includes M*L*K weights. These weights are used to calculate M motion vectors (M>0 is the number of motion hypotheses) as the weighted average of L*K motion vectors from the input projected motion vectors, where L is the number of motion fields and K (for example, K=9=3×3 neighboring blocks) is the number of blocks in the local neighborhood of the current interpolated block. The L*K weight group is normalized to have a sum of 1. In an embodiment with the increased quality, it is disclosed to use M=2, in the general case M>=1. This approach allows the CNN to correct motion vectors, but they should be in the manifold formed by the convex hull of the above mentioned motion vectors.

Figure 8:
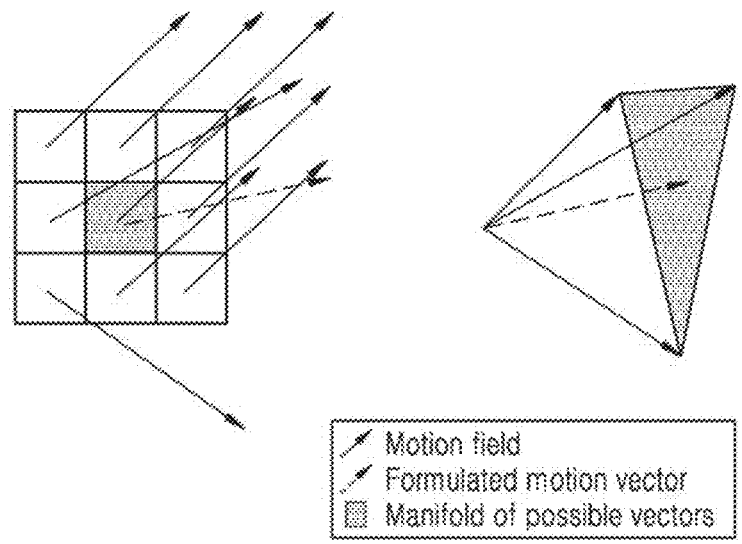
FIG. 8 is a diagram of an example of the formulated motion vector for a 3×3 neighborhood according to an embodiment.

FIG. 8 is a diagram of an example of the formulated motion vector for a 3×3 neighborhood according to an embodiment. FIG. 8 shows an example for L=1 and K=9. For each of the current block of the interpolated frame and the 8 blocks surrounding it, there are corresponding motion vectors (candidate vectors). For example, 7 of those vectors are the same, and the other 2 are different. Accordingly, there are 3 different motion vectors. A formulated vector is a weighted sum (or convex combination) of these three vectors. Further, the sum of all weights should be equal to one. The resulting vector may indicate to any point within (and on the border) of the convex hull of the three vectors (for example, in the above exemplary embodiment, in operation 105, the formulated vector may not only coincide with one of the 36 candidate vectors, but may be any vector within the convex hull of 36 candidate vectors). The formulated vector forms a motion hypothesis.

Accordingly, in another exemplary embodiment, in which M=2 motion hypotheses, L=4 motion fields, and K=9 blocks, it is necessary to have M*L*K=2*4*9=72 weights that characterize 36 motion vectors for each of the 2 hypotheses (that is, 9 motion vectors in the neighborhood of the current block in each of the 4 projected motion fields) as input in operation 105 for each block of the interpolated frame. In the example mentioned above in operation 104, the 78 weights were obtained namely for such embodiment. 72 weights therefrom are used in operation 105. The sum of products for the first 36 vectors (in particular, 36 candidate vectors are multiplied by 36 weights predicted directly by the CNN, and then added, i.e., a weighted sum is made) will result in the formulated motion vector for the first hypothesis, and the sum of products for the second 36 vectors will result in another formulated motion vector for the second hypothesis. That is, the formulated vector depends not only on the candidate vectors, but also on the weights predicted by the network.

This approach to formulating a motion vector allows the OcC CNN to generate vectors that are different from the output of the motion estimation operation 102. This allows predicting of non-linear movements, resulting in smoother video and higher PSNR. The OcC CNN in operation 104 can correct the motion vector if there were errors in the motion estimation operation 102.

The fact that the vector should be in the given manifold makes it easier to train the network and allows achieving of the high quality interpolated image. By using different schemes, it is possible to vary the number of computations required to formulate the motion vector.

Figure 9:
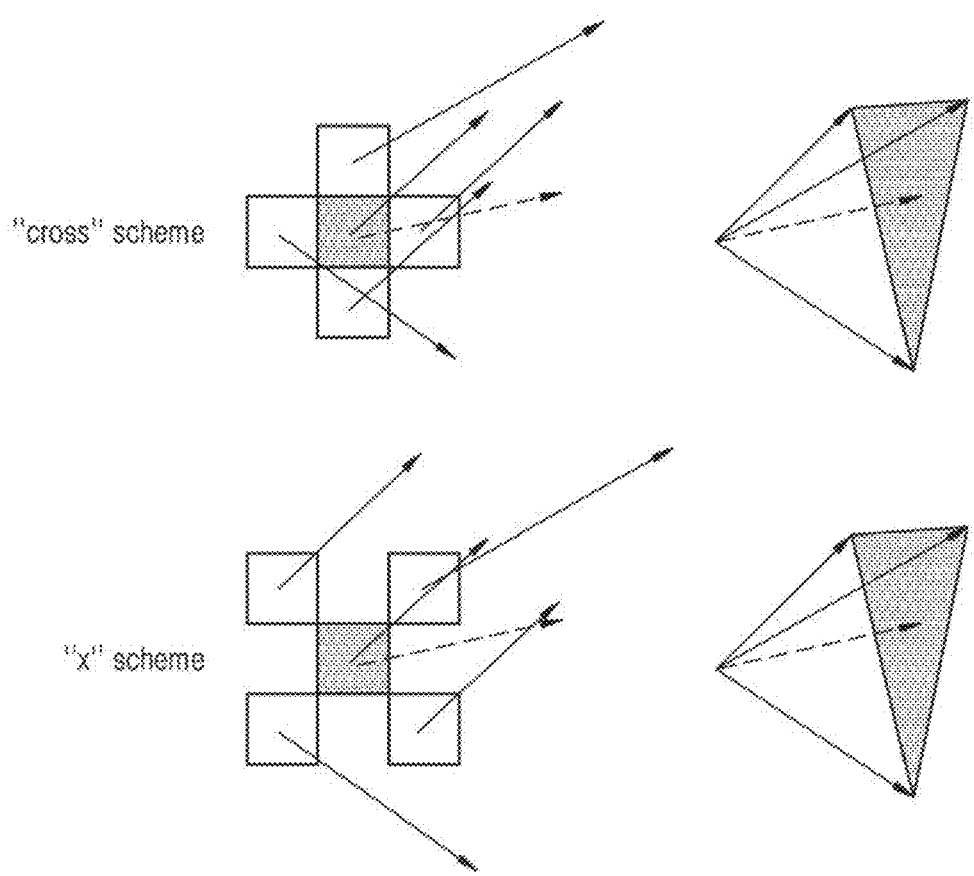
FIG. 9 is a diagram of examples of the reduced block neighborhood diagrams for formulating the motion vector according to an embodiment.

FIG. 9 is a diagram of examples of the reduced block neighborhood diagrams for formulating the motion vector according to an embodiment. For example, to decrease the number of computations without significantly degrading the quality, it is possible to use "cross" or "x" schemes to formulate the output vectors.

It should be noted that one embodiment uses the mode where M=1, L=1, K=1, and therefore it is not necessary for the CNN to generate weights other than the MIX (explained later).

Motion Compensation (Operation 106)

Next, operation 106 will be described, in which motion compensated interpolation (MCI) of the frame is performed.

The OcC CNN output post-processed in operation 105 allows further in operation 106 to interpolate the frame at the time position α defined as the distance in time from the previous frame to the time of the interpolated frame in units of distance in time of the input video frames (i.e., α=1 is the time position of the next original frame from the previous frame), with the MCI input being associated with a regular grid of blocks.

First, in the motion compensation operation 106, M predictor frames are created based on the neighboring original video frames using the corresponding M formulated motion vectors obtained in operation 105, and the weights obtained in operation 104.

Each predictor frame $Pred_i$ uses one motion hypothesis $$Pred_i(x,y) = F_N(x+\alpha \cdot dx_i(x,y), y+\alpha \cdot dy_i(x,y)) \cdot MIX_i(x,y) + F_{N+1}(x-(1-\alpha) \cdot dx_i(x,y), y-(1-\alpha) \cdot dy_i(x,y)) \cdot (1-MIX_i(x,y))$$

where the index i corresponds to the hypothesis number,
(x, y) are the pixel coordinates,
α is the interpolation phase,
$MIX_i \in [0 \ldots 1]$ are the weights predicted directly by the neural network CNN in operation 104 and characterizing the occlusion type in the given block (for example, opening, closing, etc.) according to hypothesis i,
$(dx_i, dy_i) = MV_i$ are the motion hypotheses (formulated vectors) themselves, obtained in operation 105 using the CNN output.

The CNN output is block-wise, so it is need to convert it to pixel resolution. For motion hypotheses $MV_i$, it is disclosed herein to use an interpolation taking into account the closest neighboring pixels; for weights $MIX_i$ a bilinear interpolation is used.

The previous and current neighboring original frames are weighted according to MIX to obtain each predictor frame (for example, if MIX is equal to zero, the predictor frames include only the current neighboring original frame). For the hypothesis with one movement, the predictor frame becomes an interpolated frame. If two motion hypotheses are used, then it is necessary to weight the predictor frames in order to obtain the interpolated frame.

Figure 10:
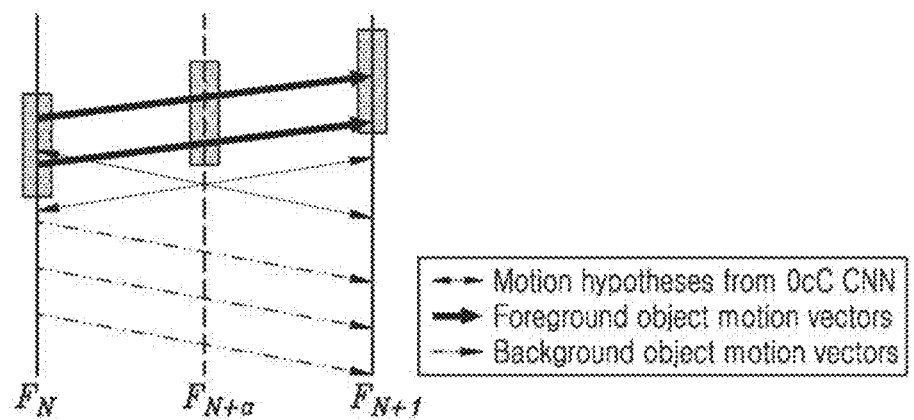
FIG. 10 is a diagram of motion compensation based on 2 hypotheses according to an embodiment.

FIG. 10 is a diagram of motion compensation based on 2 hypotheses according to an embodiment. The example of FIG. 10 shows the motion compensation based on 2 hypotheses. Foreground objects move in one direction, background objects move in the other direction. The neural network provides 2 hypotheses regarding the movement of the objects in the occlusion area, which are opened in the background because of the foreground moving relative to it.

To obtain the interpolated frame $F_{N+\alpha}$ based on the weighing of the predictor frames $Pred_1$ associated with M formulated motion vectors, the weighted average is calculated in the MCI operation 106 using the following expression:

$$F_{N+\alpha} = \Sigma_{i=1}^{M} W_i \cdot Pred_i / \Sigma_{i=1}^{M} W_i$$

Here $W_i$ are the final weights with which the predictor frames are weighted. In the conventional approach, they could be calculated using only the weights $WSAD_i$ that are based on the pixel-wise SAD calculated between the previous original frame $F_N$ illustrated on FIG. 10 and the current original frame $F_{N+1}$.

$WSAD_i$ is a monotonic function of SAD (the higher SAD value corresponds to the lower WSAD value), which characterizes the reliability of the hypothesis and can be calculated, for example, as follows:

$$WSAD = 1023 \cdot e^{-SAD^2/2 \cdot 24^2}$$

In this case, SAD, for example, can be calculated as follows:

$$SAD(x, y) = \frac{1}{15} \sum_{k=y-1}^{y+1} \sum_{m=x-2}^{x+2} \left| \begin{array}{l} F_N(m + \alpha \cdot dx(x, y), k + \alpha \cdot dy(x, y)) - \\ F_{N+1}(m - (1-\alpha) \cdot dx(x, y), k - (1-\alpha) \cdot dy(x, y)) \end{array} \right|$$

However, in the occlusion areas such weights $WSAD_i$ are unreliable. Therefore, to calculate the final weights $W_i$, it is necessary to take into account in addition to $WSAD_i$ two other values predicted by the CNN network (that is, its output data): $Confidence\_WSAD_i \in [0 \ldots 1]$ and $WC\text{-}NN_i \in [0 \ldots 1023]$.

Confidence_WSAD$_i$ is a degree of confidence to the WSAD value as to how reliable can be its using for mixing two predictor frames. It is predicted directly by the CNN. A bilinear interpolation is used to convert it to pixel resolution.

WCNN$_i$ is a number (a correction factor) predicted by the CNN, by which WSAD should be corrected if the degree of confidence to WSAD is below 1. In order to convert it to pixel resolution, it is disclosed to use an interpolation taking into account closest neighbors.

Accordingly, it is disclosed herein to calculate the final weights W$_i$ for weighing the predictor frames using the following formula:

$$W_i = WSAD_i \cdot Confidence\_WSAD_i + WCNN_i \cdot (1 - Confidence\_WSAD_i)$$

Unlike the known techniques, some embodiments of the present disclosure use a CNN for obtaining MV$_i$, MIX$_i$, Confidence_WSAD$_1$, WCNN$_i$, while MIX$_i$ and Confidence_WSAD$_i$ are individual for each motion hypothesis MV$_i$.

The use of the approach applying a CNN allows utilizing of values MIX$_i$ and Confidence_WSAD$_i$, which are unique for each motion vector. Thus, the use of the CNN output results in an improvement in the overall quality of the interpolated frame and makes a major contribution to the reduction of halo. Further, only SAD and WSAD data are pixel-wise, whereas the fields MIX$_i$, Confidence_WSAD$_i$, WCNN$_i$ are block-wise and can be scaled, that is, the present method is easily scalable.

Example

Returning to the basic example, which was considered throughout the description, the following can be noted.

As shown above, the output of operation 104 was 78 numbers (weights) at the network output.

Among them, 72 numbers were converted in operation 105 into 2 formulated motion vectors MV$_i$ (i=1, 2) corresponding to two motion hypotheses. The remaining 6 numbers were not considered in operation 105—these are MIX$_i$, Confidence_WSAD$_1$ and WCNN$_i$ corresponding to each of the two motion hypotheses.

Further, in operation 106, the formulated vectors MV$_i$ and the MIX$_i$ values are used for forming predictor frames Pred$_i$. In this case, based on the values Confidence_WSAD$_i$ and WCNN$_i$, the final weights W$_i$ are calculated. Then, using the above formula, based on the weighted average and from the obtained Pred$_i$ and W$_i$, the interpolated frame F$_{N+\alpha}$ is determined, which is the result of the entire method.

Hereinafter, some embodiments of the present disclosure will be described. It should be appreciated that the invention is not limited to these embodiments, and those skilled in the art can obtain other embodiments being guided by the principles set forth herein.

As mentioned above, the output data from the motion estimation operation 102 is the forward and backward motion field for each pair of frames. To make the input data for the CNN, the disclosure uses L (number of fields)>=1 motion fields. In one of the above described embodiments L=4 fields are used: current forward, current backward, previous backward and next forward. The use of the motion fields with L=4 provides high quality of the interpolated frames, as measured in PSNR units.

Meanwhile, the OcC CNN can use any non-empty subset of motion fields that compromises processing speed and image quality. For example, in one embodiment only one motion field is used (mode L=1). Table 3 below shows the contribution of each motion field to overall quality (PSNR).

TABLE 3

| L (number of fields) | Quality degradation [dB] |
| --- | --- |
| 4 (all fields) | 0 |
| 3 (no next forward field) | ~0.3 |
| 2 (no forward fields) | ~0.5 |
| 1 (only current backward field) | ~1 |

For example, if the next forward field is not used, the overall quality is reduced by an average of about 0.3 dB compared to using all 4 motion fields. At the same time, it provides several advantages. If an application is developed where the FRC algorithm delay is important, for example, if it is need to increase the video frame rate in the videoconference, then because the next forward motion field is unnecessary, then there is no need to wait for appearance of the next pair of frames (in the video conference case, there is no entire video, and frames are received sequentially), and the delay is significantly reduced. In addition, the number of computations for formulating the motion vector is reduced. Instead of the weighted sum of 36 vectors, this case requires calculating a weighted sum of 27 vectors.

If only current backward field is used, the overall quality is reduced by an average of about 1 dB, while even more substantial decrease in the amount of computations and delay.

In one embodiment of the method for frame rate conversion with occlusion correction, the following parameters are used:

Input of the projected MV data from one motion field (L=1),

Processing of one motion hypothesis using a CNN,

Output of only MIX data from the CNN.

In this case, post-processing operation (operation 105 of FIG. 1) is not required, because correction of the projected MV is not performed (M=1, L=1, K=1).

The CNN output data includes only MIX, because one motion hypothesis is used (M=1); and therefore, Confidence_WSAD and WCNN are not required.

In a low latency embodiment, input data includes the projected MV from the previous backward motion field and the current forward and/or backward motion fields (without the next forward motion field) and, optionally, other parameters described in operation 103 (distance to projected block, confidence measure, texture, block coverage measure, distance to frame border).

In post-processing operation (operation 105 of FIG. 1), L may be 2 or 3, and M may be 1 or 2 (a smaller number can be used to increase processing speed and decrease latency).

The CNN output data in this case may include a) all output data described hereinabove when M=2, or b) the output data described above, when M=1.

The method according to the present disclosure has been tested on various video files.

Figure 11:
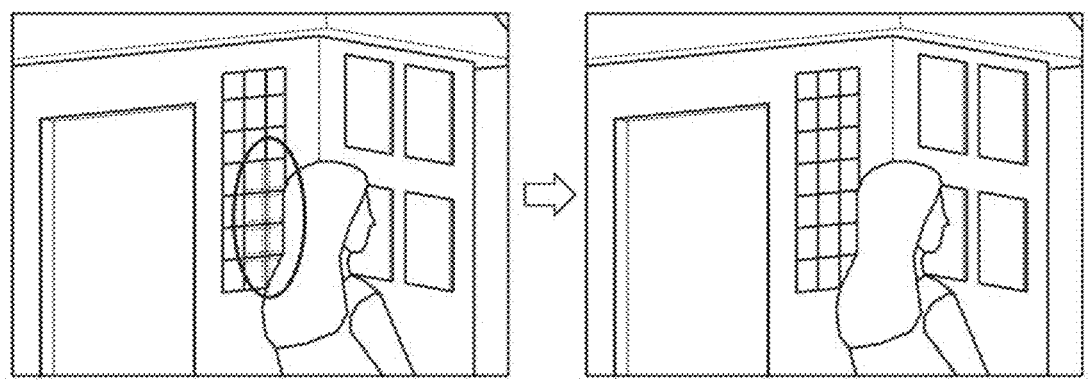
FIG. 11 is a diagram of a comparison of the interpolated frames obtained according to an embodiment.
Figure 12:
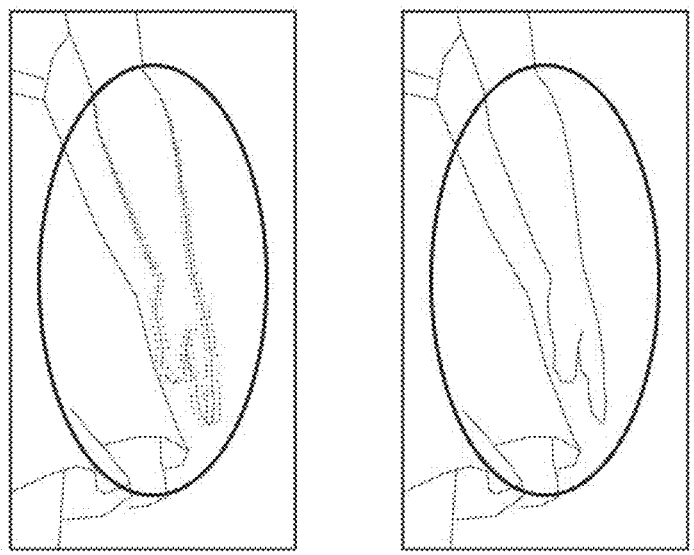
FIG. 12 is a diagram of another comparison of the interpolated frames obtained according to an embodiment.
Figure 13:
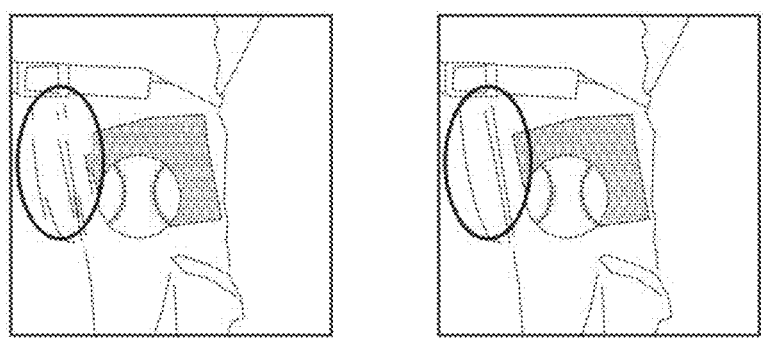
FIG. 13 is a diagram of another comparison of the interpolated frames obtained according to an embodiment.
Figure 14:
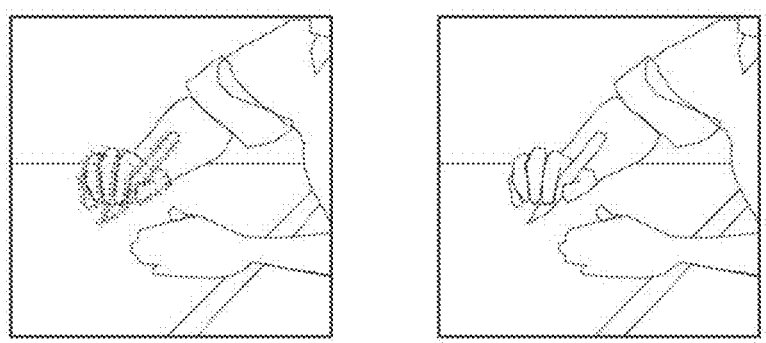
FIG. 14 is a diagram of another comparison of the interpolated frames obtained according to an embodiment.

FIG. 11 is a diagram of a comparison of the interpolated frames obtained according to an embodiment. FIG. 12 is a diagram of another comparison of the interpolated frames obtained according to an embodiment. FIG. 13 is a diagram of another comparison of the interpolated frames obtained according to an embodiment. FIG. 14 is a diagram of another comparison of the interpolated frames obtained according to an embodiment. The testing has shown that a halo caused by an occlusion is significantly reduced (FIG. 11, 12), a background area that follows the moving object is reduced (FIG. 13), the OcC CNN still works in the case of large motion vectors (FIG. 14). In FIGS. 11 to 14, an interpolated frame using the conventional approach is shown on the left and using the present disclosure is shown on the right.

Also, there is an improvement in the result of interpolation near the frame borders, an increase in PSNR, a decrease in the amount of computations, and the possibility of fine-tuning for a specific scenario is provided by selecting datasets for a specific use case.

Figure 15:
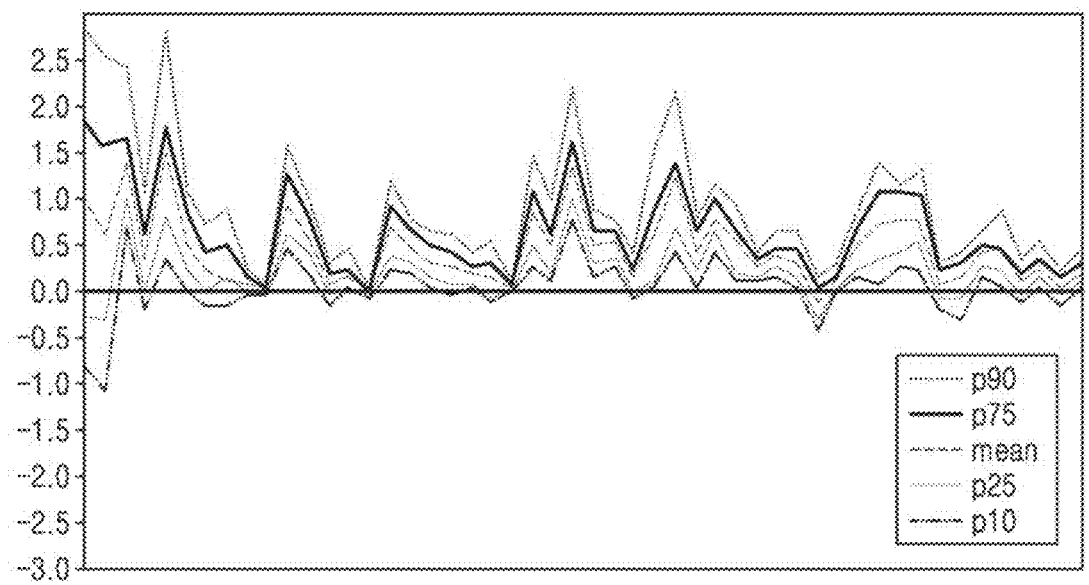
FIG. 15 is a diagram of peak signal to noise ratio (PSNR) comparison results for the interpolated frames obtained according to an embodiment.
Figure 16:
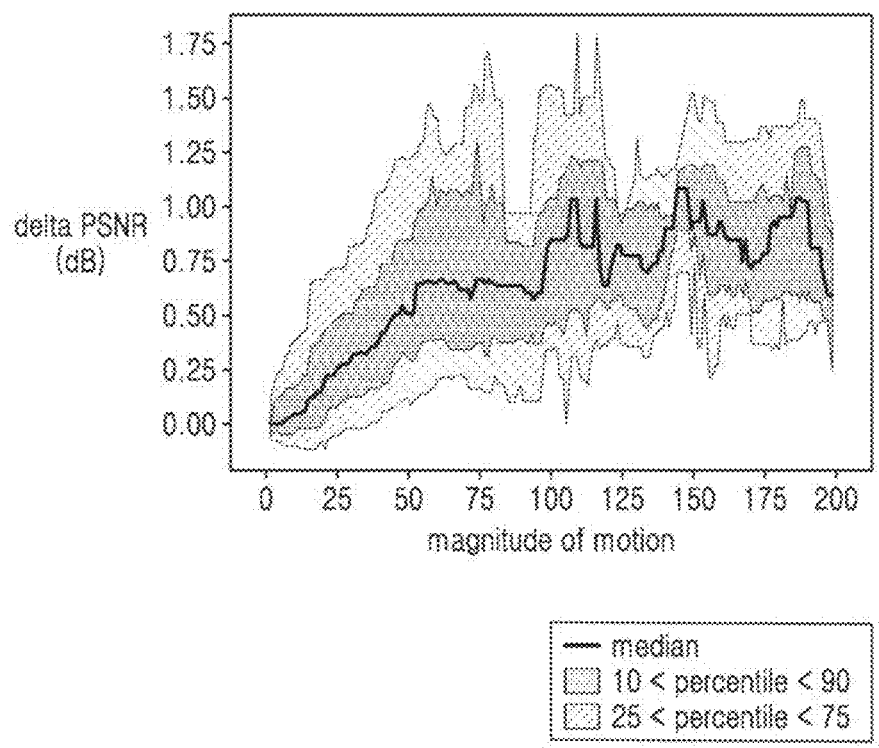
FIG. 16 is a diagram of PSNR comparison results for the interpolated frames obtained according to an embodiment.

FIG. 15 is a diagram of PSNR comparison results for the interpolated frames obtained according to an embodiment. FIG. 16 is a diagram of PSNR comparison results for the interpolated frames obtained according to an embodiment. FIGS. 15 and 16 show the results of comparing PSNR for conventional FRC and artificial intelligence (AI) FRC using OcC CNN described herein.

The graph in FIG. 15 shows some statistics of difference in PSNR between video sequences processed by the conventional FRC and by the OcC CNN FRC disclosed herein. For this purpose, all video sequences have been previously decimated, then the missing frames have been interpolated in order to be able to calculate PSNR for the interpolated frames with respect to the original frames decimated for use as a ground truth.

The mean value in this graph is the average value of difference in PSNR of the interpolated frames between the method according to the embodiments of the disclosure and the conventional method. Values p10, p25, p75, p90 are percentiles, whose values show, what part of the interpolated frames in each of the considered video sequences does not exceed the specified PSNR difference for the OcC CNN FRC method relative to the conventional FRC. For example, p10=1 dB means that PSNR of 10% of frames in the OcC CNN FRC does not exceed PSNR of frames obtained by the conventional FRC by 1 dB, whereas the remaining 90% of frames of the sequence were improved by 1 dB or more.

The graph in FIG. 16 shows the dependency of performance improvement on the magnitude of motion vectors. As follows from this graph, the performance improvement increases with increasing of the magnitude of motion vectors. For large motion vectors, the motion estimate can be unstable and cause some perturbation on the graph.

The quantized version of the OcC CNN was tested on a mobile device, the inference time is <10 ms per the interpolated HD frame (1280×720). This provides a video throughput of 200 FPS. The interpolation quality was improved by an average of 0.4 dB as compared to the previous manually created FRC processing method.

Apparatus for Frame Rate Conversion

The above description was made in terms of a method 100 of FIG. 1 for performing an FRC according to the present disclosure. Further, each of the steps can either be performed by a separate dedicated unit, or some or all of the steps can be performed by the same unit. Accordingly, an apparatus for frame rate conversion may include a motion estimator configured to perform the motion estimation operation 102 (block-wise or pixel-wise) using the input video 101, a first data preparation unit configured to perform operation 103 of preparing block-wise data for the OcC CNN for a given interpolation phase t (mostly block-wise), the neural network configured to perform operation 104 of occlusion correction (block-wise), the second data preparation unit configured to perform operation 105 of preparing data for motion compensation (block-wise), and the interpolation unit configured to perform operation 106 of motion compensated interpolation (block-wise/pixel-wise). As shown above, the second data preparation unit is optional.

In an embodiment, an apparatus for frame rate conversion can represent, e.g., a computer, and include a processor that is configured to invoke and execute computer programs from a memory to perform steps 102 to 106 of FIG. 1 or functions of units in accordance with embodiments of the present disclosure. According to the embodiments, the apparatus may further include a memory. The processor may invoke and execute computer programs from the memory to perform the method of frame rate conversion. The memory can be a separate device independent of the processor, or can be integrated into the processor.

At least one of the steps in the method 100 of FIG. 1 or units in the apparatus configured to perform the method of FIG. 1 can use an AI model to perform appropriate operations. A function associated with AI may be performed through a non-volatile memory, a volatile memory, and a processor.

A processor may include one or more processors. At the time, one or more processors may be a general purpose processor, such as a central processing unit (CPU), an application processor (AP), or the like, a graphics-only processing unit such as a GPU, a visual processing unit (VPU), and/or an AI-dedicated processor such as a neural processing unit (NPU).

The one or more processors control the processing of the input data in accordance with a predefined operating rule or artificial intelligence (AI) model stored in the non-volatile memory or the volatile memory. The predefined operating rule or artificial intelligence model can be provided through training or learning. Further, the processor can perform an operation of preprocessing data to transform it into a form suitable for use as an input to an artificial intelligence model.

Here, "being provided through learning" means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may include a plurality of neural network layers. Each layer of the plurality of neural network layers includes a plurality of weight values, and performs a layer operation through calculation of a previous layer and an operation of a plurality of weights.

Examples of neural networks include, but are not limited to, a CNN, a deep neural network (DNN), a recurrent neural network (RNN), a restricted Boltzmann Machine (RBM), a deep belief network (DBN), a bidirectional recurrent deep neural network (BRDNN), generative adversarial networks (GAN), and deep Q-networks.

The learning algorithm is a method for training a predetermined target device (for example, a GPU-based neural network) using a plurality of learning data to cause, allow, or control the target device to make a determination or prediction. Examples of learning algorithms include, but are not limited to, supervised learning, unsupervised learning, semi-supervised learning, or reinforcement learning.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The above mentioned memory may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM). Further, the memory in embodiments of the present disclosure can be a static random access memory (SRAM), dynamic random access memory (DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synch link DRAM (SL-DRAM) and Direct Rambus RAM (DR RAM), and so on. That is to say, the memory in the embodiments of the present disclosure includes but is not limited to these and any other suitable types of memories.

Information and signals described herein may be represented using any of a variety of different technologies. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure herein. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media include both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include a RAM, a ROM, a EEPROM, flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

It should be appreciated that the principle of operation and basic examples of a method and apparatus for frame rate conversion with occlusion correction based on a convolutional neural network are shown herein. A person skilled in the art using these principles will be able to obtain other embodiments of the disclosure without creative effort.

The present disclosure can be widely used in video processing, for example, in cases of real-time requirements (for example, a video playback, video calls, a conversion during video capture), in devices with limited computing capabilities (mobile phones, TVs), and can be easily adapted to new usage scenarios with special requirements for an OcC and the whole sequence of FRC.

Use cases can include the Super-Slow-Motion camera mode with a frame rate conversion from 480 to 960 FPS, which allows, for example, shooting in low light conditions or with long exposure; a video editor with frame rate conversion from 240 to 480 FPS, which allows using slow motion effects in the edited video; a gameplay interpolation by converting the frame rate from the device's native 48 FPS in-game to 90 FPS for smoother video sequence and a better gaming experience.

It should be appreciated that although herein such terms as "first", "second", "third", etc. may be used to describe various elements, components, regions, layers and/or sections, these elements, components, regions, layers and/or sections should not be limited by these terms. These terms are only used to distinguish one element, component, region, layer or section from another element, component, region, layer or section. So, the first element, component, region, layer or section may be termed a second element, component, region, layer or section without going beyond the scope of the present disclosure. In the present description, the term "and/or" includes any and all combinations of one or more of the respective listed items. The elements referred to in the singular do not exclude a plurality of elements, unless otherwise specified.

Functionality of the element specified in the description or the claims as a single element can be implemented in practice through several components of the device, and vice versa, functionality of the elements specified in the description or claims as multiple separate elements can be implemented in practice by a single component.

Functional relationship of elements should be understood as a connection providing correct cooperation of these elements with each other and implementing a particular functionality of elements. Particular examples of functional relationship may be a connection providing exchange of information, a connection providing transmission of electric current, a connection providing transfer of mechanical motion, a connection providing transmission of light, sound, electromagnetic or mechanical vibrations, etc. The specific form of functional relationship is determined by the nature of interaction of the elements, and, unless otherwise specified, is provided by well-known means using the principles well-known in the art.

Structural embodiment of elements of the present device is known to those skilled in the art and is not described separately in this document, unless otherwise specified.

Although exemplary embodiments have been described in detail and shown in the accompanying drawings, it should be appreciated that such embodiments are merely illustrative and are not intended to limit the present invention and that the invention should not be restricted to the specific shown and described layouts and designs, because various other modifications and embodiments of the disclosure that do not go beyond the essence and scope of the disclosure, will be apparent to those skilled in the art based on the information included in the description, and knowledge of the art.

The invention claimed is:

1. A method for converting a frame rate of an input video, the method comprising:
   performing a motion estimation by generating at least one motion field for at least one pair of frames of the input video, wherein the at least one motion field comprises a set of motion vectors for each block of a first reference frame of the input video, the set of motion vectors indicating to a second reference frame of the input video;
   preparing first data for a predetermined interpolation phase for each block of an interpolated frame, wherein the first data comprise at least one parameter for a pre-trained occlusion processing (OcC) convolutional neural network (CNN), the at least one parameter being obtained based on the at least one motion field;
   performing occlusion correction with the OcC CNN for each block of the interpolated frame by predicting weights associated with the set of motion vectors based on the prepared first data; and
   performing motion compensation for each block or for each pixel of the interpolated frame by processing data from the OcC CNN.

2. The method of claim 1, wherein the at least one motion field for the at least one pair of frames of the input video comprises at least one of a current forward motion field, a current backward motion field, a previous backward motion field, or a next forward motion field.

3. The method of claim 1, wherein the first data comprises a projected motion vector for each block of the interpolated frame, and
   wherein the projected motion vector in a current block in the interpolated frame is a closest vector among motion field vectors for a given pair of frames.

4. The method of claim 1, wherein the first data comprises a distance to a projected block for each block of the interpolated frame, and
   wherein the distance to the projected block indicates a distance between a center of a current block in the interpolated frame and a center of the projected block.

5. The method of claim 1, wherein the first data comprises a confidence measure for each block of the interpolated frame, and
   wherein the confidence measure characterizes a similarity between a block of the first reference frame, from which a considered motion vector originates, and a corresponding block of the second reference frame, to which the considered motion vector indicates.

6. The method of claim 1, wherein the first data comprises a texturedness measure for each block of the interpolated frame, and
   wherein the texturedness measure indicates how much a current block in the interpolated frame differs from a uniform background.

7. The method of claim 1,
   wherein the at least one motion field for the at least one pair of frames of the input video comprises a current forward motion field and a current backward motion field,
   wherein the first data comprises a block coverage map for each block of the interpolated frame for the current forward motion field and the current backward motion field, and
   wherein the block coverage map shows how many pixels of a current block in an interpolated frame grid were covered by all projected blocks from the first reference frame.

8. The method of claim 1, wherein the first data comprises a distance to a frame border for each block of the interpolated frame, and
   wherein the distance to the frame border indicates a minimum distance among distances from a current block in an interpolated frame grid to an edge of a frame in horizontal and vertical directions in block units.

9. The method of claim 1, further comprising:
   training the CNN based on minimizing a loss function when processing a synthetic dataset used for pre-training and a natural dataset used to fine-tune the CNN,
   wherein video sequences from each dataset are preliminarily decimated, and then missing frames are interpolated and compared with original frames extracted during the preliminary decimation for use as a ground truth, and
   wherein the loss function reflects a difference between an actual interpolated frame and an original frame as a real number.

10. The method of claim 9, wherein the training is performed using:
    a cluster inertia loss function that is used to predict two motion vectors for each block according to a hypothesis in which a block is in an occlusion area and comprises both a foreground object, to which a cluster of motion vectors of a foreground object corresponds, and a background object, to which a cluster of motion vectors of a background object corresponds; or
    a blockiness loss function that indicates a degree of blockiness artifacts in the interpolated frame.

11. The method of claim 1, wherein the occlusion correction with the OcC CNN for each block of the interpolated frame is further performed by predicting weights characterizing an occlusion type in a given block according to a motion hypothesis, based on the prepared first data and the motion estimation.

12. The method of claim 1, wherein the occlusion correction with the OcC CNN for each block of the interpolated frame is further performed by predicting weights characterizing a degree of confidence to a hypothesis reliability value of a given hypothesis calculated based on the first reference frame and the second reference frame, and a correction factor for the hypotheses reliability value.

13. The method of claim 1, further comprising preparing second data for each block of the interpolated frame,
    wherein the second data is used for motion compensation, and
    wherein the preparing the second data comprises calculating at least one motion hypothesis based on motion vectors for blocks in a local neighborhood of a current interpolated block.

14. The method of claim 1, wherein the motion compensation comprises:
    generating at least one predictor frame for each motion hypothesis based on neighbor reference video frames using corresponding obtained motion vectors and the predicted weights, and
    determining the interpolated frame based on the at least one predictor frame.

15. An apparatus for converting a frame rate of an input video, the apparatus comprising:
    a memory storing instructions; and
    a processor configured to execute the instructions to:
        perform a motion estimation by generating at least one motion field for at least one pair of frames of the input video, wherein the at least one motion field comprises a set of motion vectors for each block of a first reference frame of the input video, the set of motion vectors indicating to a second reference frame of the input video;

prepare first data for a predetermined interpolation phase for each block of an interpolated frame, wherein the first data comprise at least one parameter for a pre-trained occlusion processing (OcC) convolutional neural network (CNN), the at least one parameter being obtained based on the at least one motion field;

perform occlusion correction with the OcC CNN for each block of the interpolated frame by predicting weights associated with the set of motion vectors based on the prepared first data; and perform motion compensation for each block or for each pixel of the interpolated frame by processing data from the OcC CNN.

* * * * *